S. S. THOMPSON.
Step-Ladders.
No. 150,912. Patented May 12, 1874.
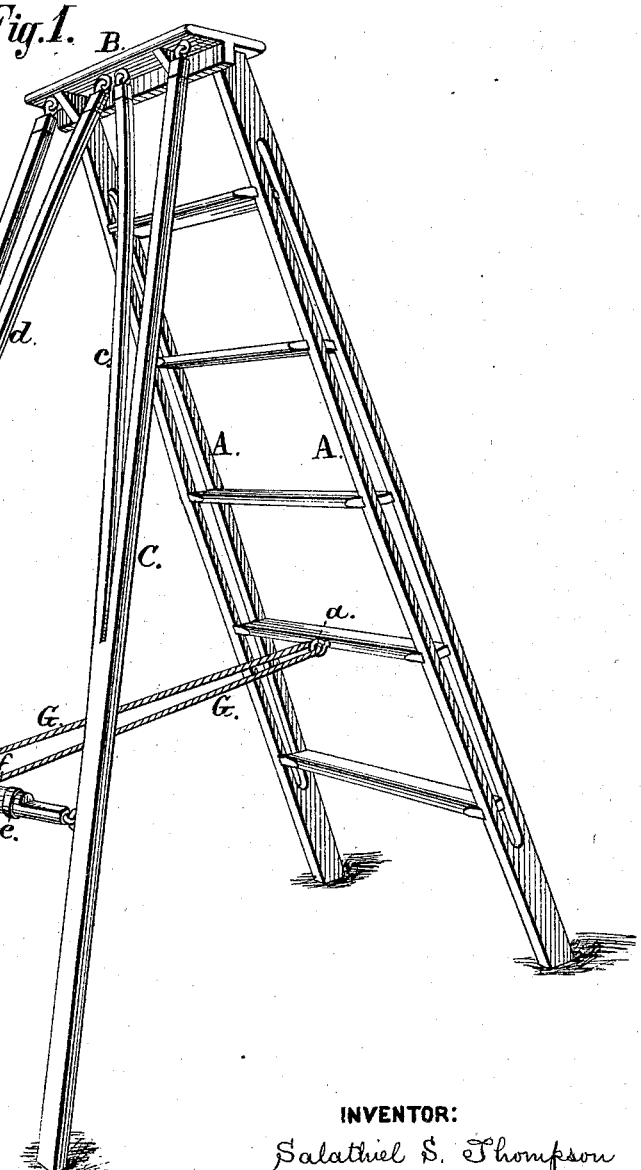
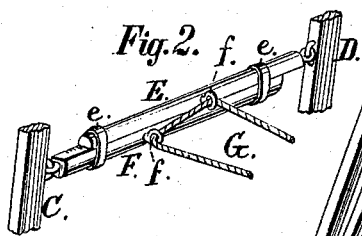
ATTEST:
Robert Burns
Walter Allen
INVENTOR:
Salathiel S. Thompson
By Knight Bros.
Attys.

UNITED STATES PATENT OFFICE.

SALATHIEL S. THOMPSON, OF ST. LOUIS, MISSOURI, ASSIGNOR OF ONE-HALF HIS RIGHT TO PHILLIP MEDART AND FREDERICK MEDART, OF SAME PLACE.

IMPROVEMENT IN STEP-LADDERS.

Specification forming part of Letters Patent No. 150,912, dated May 12, 1874; application filed October 7, 1873.

*To all whom it may concern:*

Be it known that I, SALATHIEL S. THOMPSON, of St. Louis, St. Louis county, Missouri, have invented an Improvement in Step-Ladders, of which the following is a specification:

This invention consists in forming the prop-legs, which are hinged to the ends of the ladder top, with branches or side braces, which are also hinged to the ladder top, as shown, the purpose of which is to cause the props to move in planes passing through the main side pieces or legs, and give a firm side bearing, and prevent swaying of the ladder. The prop-legs are connected together by an extensible stay, formed of two pieces, each sliding in a sleeve or semicircular ferrule on the other, and each being provided with an eye through which is passed a stay-cord, that limits the distance of the props from the side pieces.

This arrangement allows one of the prop-legs to swing past the other, in order to adjust the props to any unevenness in the ground, and at the same time furnish a firm support for the main part of the ladder.

Figure 1 is a back perspective view. Fig. 2 is a detail perspective of the extensible stay.

A A are the side pieces of the ladder, having usual top or platform step B, to which are hinged the prop-legs C D, which are forked, to form side braces *c d*, that are hinged to the top board or step B, near its center. E F is an expansible stay or connecting-bar, whose ends are secured by eyebolts to the legs C D. The said stay consists of bars E F, sliding endwise on each other, each sliding in a ferrule, *e*, secured to the other bar. G is an endless or double stay-cord, passing through the eye *a* of the main part of the ladder, and through the eyes *f* on the bars E F, as shown.

The lower ends of the side pieces A A are first placed in position on the floor or ground, then the props are drawn away from them until the stay-cord G is tightened, so as to prevent the props spreading out farther from the main part.

Where the ground is uneven, either of the props may be placed at a greater distance from the side pieces A, as shown in Fig. 1, so as to get a bearing for all the four feet of the ladder, irrespective of the unevenness of the ground.

The props are confined to a movement or oscillation in parallel planes, but move independently of each other, except that their outward movement from the side pieces A is limited by the stay-cord G and stay-bar E F, so that if one of the props is moved out farther, (as F, Fig. 1,) the other, E, is restrained by the stays, as shown, at a position less distant from the side pieces. This freedom of motion in the props is allowed by making the stay-bar E F extensible; but when the stay-cord G is stretched out tight, it prevents the further extension of the stay E F, owing to its being passed through the eyes *f*, one of which is secured to each of the bars E and F, respectively.

I am aware that step-ladders have heretofore been made, in which the prop-legs have been pivoted to the platform at the upper end, and connected together by an unextensible stay; but in this case, in uneven ground, when one prop is thrown up higher than the other, and consequently at a greater distance from the main part of the ladder, the feet of the props are brought nearer to a line passing between the side pieces and the props, and consequently the stability of the ladder is decreased; whereas, with my props, as they swing out in a plane parallel with a medial line between the feet of the side pieces A A and the props E F, the side bearing of the props is always equal, whatever their relative position.

Again, if the props are spread at the base to give a wide bearing, so as to partially overcome the above difficulty, the ladder is cumbrous when folded together, the prop-base being wider than the base of the side pieces A A; whereas, with my ladder, the props fold up snugly to the side pieces, but yet have an equal and sufficient side bearing in all positions; and though they have an independent movement, so as to adapt them to rough ground, yet they are separately braced against side movement, and, by the stays E, F, and G, are prevented from spreading too far from the side pieces A A, while having the necessary independent motion to allow for adjustment.

I claim as my invention—

The combination of the side pieces A A, top board B, with the prop-legs C D having braces $c\ d$, expansive stay E F, collars $e$, eyes $f$, and cord G, substantially as and for the purpose set forth.

SALATHIEL S. THOMPSON.

Witnesses:
 SAML. KNIGHT,
 ROBERT BURNS.